(12) United States Patent
Finn et al.

(10) Patent No.: US 7,839,800 B2
(45) Date of Patent: Nov. 23, 2010

(54) MULTIPLE I-SERVICE REGISTRATION PROTOCOL (MIRP)

(75) Inventors: Norman W. Finn, Livermore, CA (US); Francois E. Tallet, Santa Clara, CA (US); Ali Sajassi, San Ramon, CA (US)

(73) Assignee: Cisco Technology, Inc., San Jose, CA (US)

(*) Notice: Subject to any disclaimer, the term of this patent is extended or adjusted under 35 U.S.C. 154(b) by 135 days.

(21) Appl. No.: 12/218,169

(22) Filed: Jul. 11, 2008

(65) Prior Publication Data

US 2009/0190504 A1    Jul. 30, 2009

Related U.S. Application Data

(60) Provisional application No. 61/062,253, filed on Jan. 24, 2008.

(51) Int. Cl.
*H04L 12/28* (2006.01)
(52) U.S. Cl. ............... 370/254; 370/466; 370/401; 370/392
(58) Field of Classification Search .............. None
See application file for complete search history.

(56) References Cited

U.S. PATENT DOCUMENTS

| | | | |
|---|---|---|---|
| 2005/0259597 A1* | 11/2005 | Benedetto et al. ......... 370/254 |
| 2007/0140284 A1 | 6/2007 | Blankenship et al. | |
| 2008/0013547 A1 | 1/2008 | Klessig et al. | |
| 2008/0170583 A1* | 7/2008 | Sultan et al. ............. 370/422 |
| 2008/0212595 A1* | 9/2008 | Figueira et al. .......... 370/401 |
| 2008/0275972 A1* | 11/2008 | Ellis et al. ............... 709/223 |
| 2008/0281987 A1* | 11/2008 | Skalecki et al. .......... 709/253 |
| 2009/0129386 A1* | 5/2009 | Rune ....................... 370/392 |
| 2009/0141717 A1* | 6/2009 | Cabeca et al. ........... 370/389 |
| 2009/0168671 A1* | 7/2009 | Holness et al. .......... 370/256 |

* cited by examiner

*Primary Examiner*—Duc C Ho
(74) *Attorney, Agent, or Firm*—Patterson & Sheridan, LLP (57) ABSTRACT

In one embodiment, a method associated with a multiple I-service registration protocol (MIRP) includes receiving into an 802.1ah I-component an MVRP TCN from an 802.1ad component. The TCN may be received, for example, from an 802.1ad bridge. The TCN may identify an affected service using an S-VID. Therefore, the example method may include identifying the S-VID specified by the TCN. The method may also include identifying I-SIDs related to the S-VID. The I-SIDs may be identified by consulting an S-VID to I-SID translation table associated with the 802.1ah I-component. The method may also include providing an 802.1ah MIRP PDU to another 802.1ah component. The MIRP PDU may be based on the MVRP TCN and on the I-SID.

21 Claims, 10 Drawing Sheets

Figure 10

MULTIPLE I-SERVICE REGISTRATION PROTOCOL (MIRP)

CROSS REFERENCE TO RELATED APPLICATIONS

This application claims the benefit of U.S. Provisional Patent Application 61/062,253, titled Multiple I-Tag Registration Protocol, filed Jan. 24, 2008, by the same inventors.

TECHNICAL FIELD

This disclosure relates generally to an IEEE 802.1ah component receiving an IEEE 802.1ad topology change notification (TCN). More specifically, the disclosure relates to producing an 802.1ah multiple I-tag registration protocol (MIRP) message to facilitate propagating information associated with the 802.1ad TCN to a set of 802.1ah components.

Networking Acronyms

These acronyms are defined explicitly for use as short forms for networking terms recited herein.
- B-DA backbone destination address
- B-SA backbone source address
- B-MAC backbone media access control
- B-tag backbone tag
- B-VID a backbone VID
- CFI canonical format indicator
- DSL digital subscriber line
- DSLAM DSL access multiplexer
- FCS frame control sequence
- IEEE Institute of Electrical and Electronics Engineers
- I-component instance component
- IP internet protocol
- I-SID instance SID
- I-tag instance tag
- LAN local area network
- L2GP layer two gateway protocol
- LLC logical link control
- MAC media access control
- MAD MRP attribute declaration
- MAP MRP attribute propagation
- MIRP multiple I-service registration protocol
- MRP multiple registration protocol
- MVRP multiple VLAN registration protocol
- MSTP multisource transport platform
- MAC media access control
- NNI network node interface
- OSI open systems interconnect
- PB provider bridge
- PBB provider backbone bridge
- PIP provider instance port
- PDU protocol data unit
- RSTP rapid spanning tree protocol
- SAP service access point
- S-bridge service bridge
- S-tag service tag
- SID service identifier
- S-VID service VID
- TCN topology change notification
- VID VLAN identifier
- VLAN virtual LAN
- V-SID VLAN SID
- WAN wide area network IEEE Standards Referenced IEEE 802.1Q is a standard that defines bridges. 802.1Q concerns VLAN Tagging and describes a mechanism to allow multiple bridged networks to transparently share the same physical network link without leaking information between networks.

IEEE 802.1ak defines MVRP. MVRP facilitates participants in an MRP application registering attributes with other participants in a bridged local area network.

IEEE 802.1ad (Provider Bridges) is an amendment to IEEE standard IEEE 802.1Q-1998. 802.1ad describes an architecture and bridge protocols to provide separate instances of MAC services to multiple independent users of a Bridged Local Area Network. 802.1ad defines a Q-in-Q (VLAN stacking) capability so that a service provider can offer 4k Ethernet services using S-bridges and C-components.

IEEE 802.1ah extends 802.1Q and 802.1ad to define a MAC-in-MAC capability that can support a service provider offering more than 4k (e.g., millions) of services using B-components and I-components. 802.1ah describes PBB. PBB is available in carrier layer 2 Ethernet switches and provides for layering an Ethernet network into customer and provider domains with isolation among their MAC addresses. PBB defines a B-DA and B-SA. PBB defines a B-VID and an I-SID.

IEEE 802.3 is a collection of IEEE standards associated with wired Ethernet. 802.3 defines the physical layer and the MAC sublayer of the data link layer.

BACKGROUND

A LAN may include a set of common hosts with a common set of requirements that communicate over a single medium (e.g., wire). IEEE 802.3 provides standards associated with one type of LAN (Ethernet). A VLAN may also include a set of common hosts with a common set of requirements. Members of the VLAN may communicate as if they are attached to the same medium (e.g., wire) but they may not be actually attached to the same medium. Members of the VLAN may be physically located in different LANs. Therefore, a network device(s) may be required to connect the LANs in which the VLAN elements are found. A bridge is one such network device. A bridge operates at layer two (data link) of the well known OSI protocol stack (application, presentation, session, transport, network, data link, physical). The data link layer is generally concerned with physical addressing (e.g., MAC, LLC). A bridge may connect two LANs. Connecting the two LANs may include processing LAN element addresses. More generally, a bridge may connect multiple network segments at the data link layer. Since bridging takes place at the data link layer, a bridge may process information (e.g., addresses) from each frame of data received. The IEEE 802.1ad amendment to IEEE 802.1Q provides standards associated with one type of bridge (e.g., PB). 802.1Q assigns frames to VLANs by filtering. 802.1Q assumes the presence of a spanning tree and an explicit tagging scheme with one level tagging. A frame may include, for example, a destination address, a source address, a tag consisting of an ether type and a tag control information section, a MAC length/type, data, some pad, and an FCS. The tag control information section may include a priority field, a CFI, and a VID. VLAN membership may be identified by different methods including, for example, by port, by MAC address, by protocol type, by IP subnet address, and so on.

In some cases LANs may not be directly connectable by a single bridge or even by a pair of bridges. Therefore a collection of network devices may be required to connect the LANs. One collection of devices may be referred to as a PBB network (a.k.a. PBB-cloud). IEEE 802.1ah provides standards associated with one type of PBB network that can be used to connect different LANs in which elements of a VLAN may be found. Recall that a VLAN may include elements that are located in different physical LANs that are connected using PBs and a PBB network. IEEE 802.1Q provides standards associated with VLANs. For example, 802.1Q defines how a LAN frame (e.g., Ethernet frame) may be "tagged" with a header that is added to the frame. The VLAN tag may include a VID that is added to the frame as it is switched out of the LAN and onto a shared backbone (e.g., PBB). However, information (e.g., addresses, service identifiers) associated with a first LAN may be independent from information associated with a second LAN. Additionally, information (e.g., addresses, service identifiers) and/or formats (e.g., address lengths, service identifier lengths) may be independent between a LAN and a PBB. Yet information is communicated between VLAN members residing in separate LANs that are connected by a PBB. The PBs or PBBs construct an active topology of LANs (e.g., a spanning tree) for forwarding data on VLANs. Multiple VLANs can share a single spanning tree. Routing decisions for how to route a specific address over the active topology of a VLAN may be learned over time. Once again standards provide guidance on topology creation, address learning, and address un-learning.

BRIEF DESCRIPTION OF THE DRAWINGS

In the accompanying drawings, which illustrate various embodiments, it will be appreciated that the illustrated element boundaries (e.g., boxes, groups of boxes, or other shapes) are representative and not limiting. One of ordinary skill in the art will appreciate that in some embodiments one element may be designed as multiple elements, that multiple elements may be designed as one element, that an element shown as an internal component of another element may be implemented as an external component and vice versa, and so on. Furthermore, elements may not be drawn to scale.

OVERVIEW

In one embodiment a logic is encoded in a tangible medium for execution. When executed the logic is operable to receive a TCN in a first 802.1ah I-component and to identify an S-VID associated with the TCN. The S-VID may be associated with a service in a network from which the TCN was received. Therefore, when executed the logic may identify an I-SID related to the S-VID and selectively provide an 802.1ah MIRP PDU to signal a second 802.1ah component to ignore an association between a customer-space MAC address and a b-space I-component MAC address. The association to be ignored, forgotten, and/or relearned may be an association related to the service.

In another embodiment, an apparatus may include a logic (e.g., hardware, software in execution, firmware) to receive a TCN from an 802.1ad device. The logic may be associated with a first 802.1ah I-component associated with a PBB-cloud. The apparatus may also include a translation logic to translate an S-VID associated with the TCN to an I-SID. The S-VID may identify a service known to the 802.1ad device for which there is a corresponding I-SID. The apparatus may also include an MIRP logic to produce a MIRP PDU. The MIRP PDU will be based, at least in part, on the TCN, the S-VID and the I-SID. The MIRP PDU is to control a second 802.1ah I-component associated with the PBB-cloud to relearn an association between a customer-space MAC address and a B-space I-component MAC address. The association to be forgotten, ignored, and/or relearned may be related to the service.

DESCRIPTION OF EXAMPLE EMBODIMENTS

LAN and/or VLAN membership may change over time. Additionally, routes between LAN members and/or VLAN members may change over time. Therefore, standards may provide guidance on how a bridge component may be told to forget what it has learned concerning a routing decision and to learn new information. Recall that information and/or formats may differ between LANs and/or PBBs. Therefore, some actions (e.g., unlearning routing decisions) may differ and/or be more complicated in the VLAN environment than in the LAN environment. Commands, protocols, procedures, and so on, for unlearning routing decisions may differ. This may be particularly complicated when multiple LANS participate in a VLAN and are connected using a PBB.

Figure 1:
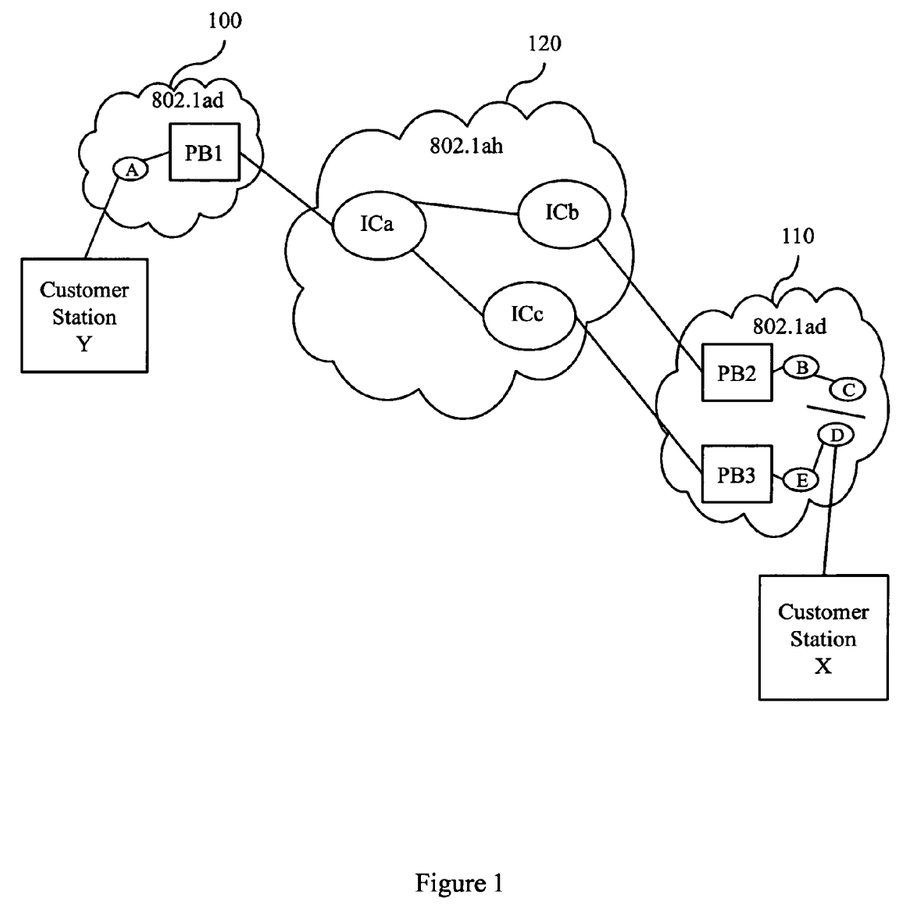
FIG. 1 illustrates a first state of a VLAN implemented across an S-cloud/PBB/S-cloud topology.

FIG. 1 illustrates three network clouds. The left most cloud 100 represents an 802.1ad network, which may be referred to as an S-cloud. The right most cloud 110 also represents an 802.1ad network that may also be referred to as an S-cloud. The middle cloud 120 represents an 802.1ah (PBB) network that may be referred to as a PBB-cloud. The left most cloud 100 includes two S-bridges PB1 and A. The right most cloud 110 includes six S-bridges, PB2, PB3, B, C, D, and E. The center cloud 120 includes three I-components, ICa, ICb, and ICc. The B-components (B-bridges) in the center cloud 120 are not shown. Two customer stations are illustrated. Customer station X is associated with the right most S-cloud 110 while customer station Y is associated with the left most S-cloud 100. Note that in cloud 110 there is a block between bridges C and D. This block may lead to the establishment of a path from X to Y that does not pass through the blocked link. Later figures illustrate a line break between D and E. Before this link breaks, bridge D may advertise the fact that it needs to receive broadcasts and unknowns for a VID (e.g., VID10). These advertisements go through E to PB3 and then to ICc. After the line break between D and E, bridge D will still send advertisements. After the break the advertisements will travel through C, B, and PB2 to reach ICb. A TCN for VID10 will also be provided. The TCN for VID10 will be sent once or for a period of time but then will no longer be sent. The advertisements will still continue to be sent. These advertisements drive the embodiment associated with FIG. 5. Note that a single MVRP/MIRP PDU may provide needs and TCNs for many (e.g., 4k) VIDs/SIDs.

Consider a VLAN with members in two different 802.1ad networks (e.g., S-cloud 100 and S-cloud 110) that are connected by an IEEE 802.1ah PBB network (e.g., PBB-cloud 120). An internetworking issue may arise when I-components in the PBB network carry a service whose data frames do not include S-tags. S-tags are described in 802.1Q. S-tags may be added to frames as they are switched out of a LAN. S-tags may carry S-VID information. Instead of communicating S-tags associated with PBs, I-components may communicate I-tags associated with PBBs. Frames passed among I-components may carry B-MAC addresses, a B-VID, an I-tag, data, and a checksum. The I-tag may encapsulate a customer (C) Ethernet frame, for example. The I-components may communicate 24-bit I-SIDs in I-tags to carry service information. The I-SIDs may not be identical to service identifiers in the end point LANs (e.g., S-VID). Additionally, when the PBB connects two LANs, the two LANS may have different, unrelated S-VID spaces. In this independent S-VID case, S-tags may need to be translated. An S-tag may need to be processed to reconcile a service identifier in a LAN (e.g., S-VID) with a service identifier in the PBB (e.g., I-SID) as the information reaches the PBB. When the information leaves the PBB and enters another LAN, there may need to be another manipulation from I-SID to S-VID.

An internetworking compatibility issue arises when an I-component detects a topology change in a given service. The I-component may learn of the topology change through an MVRP process (e.g., TCN) and/or through an MSTP or RSTP process. MVRP is defined in IEEE 802.1ak. MSTP and RSTP are defined in IEEE 802.1Q. MVRP defines an MRP application that provides a VLAN registration service. The 802.1ak standard describes how "MVRP uses MRP attribute declaration (MAD) and MRP attribute propagation (MAP), which provide the common state machine descriptions and the common attribute propagation mechanisms defined for use in MRP-based applications." (Page 62, §11.2) The 802.1ak standard also describes how "MVRP provides a mechanism for dynamic maintenance of the contents of Dynamic VLAN registration entries for each VLAN, and for propagating the information they contain to other bridges. This information allows MVRP-aware devices to dynamically establish and update their knowledge of the set of VLANs that currently have active members, and through which ports those members can be reached." (Id.) MVRP facilitates rapid healing of network failures by facilitating communicating topology changes for each VLAN independently of the spanning tree supporting the VLAN. The healing may be based on receiving a TCN.

Irrespective of how the I-component learns of the topology change, it may need to signal other I-components to unlearn MAC addresses associated with the affected service. In one embodiment, the I-components may need to unlearn a MAC address to I-component association previously learned. However, the message and/or command received concerning the topology change may not be suitable for direct propagation into a PBB because the message and/or command is associated with MVRP as applied in a topology having multiple LANs whose addresses and S-VID spaces are separate from the backbone addresses and B-VIDs of the PBB. In addition to signaling a TCN for a VID (e.g., VID x), an MVRP/MIRP also signals the need to send frames on VID x that have a destination address that is either the broadcast address or a (uni)multicast address whose specific destination(s) is not known in a particular direction. While this is described as being "in addition to signaling a TCN", this need signaling may be a motivating factor for MVRP.

The IEEE 802.1ak protocol provides for signaling the need to unlearn MAC address for a particular LAN. The 802.1ak protocol relies on S-VIDs. As described above, S-VIDs are unsuitable for identifying services among I-components. Therefore MVRP cannot be used as-is for communicating to PBB devices the need to unlearn MAC address to I-component associations. Similarly, the IEEE 802.1Q RSTP or MSTP protocols cannot be used because the topology of their networks is independent from that of PBBs. Therefore, this application describes example apparatus, media, and methods that facilitate communicating the need to unlearn MAC address to I-component associations in a PBB after being informed of the need to unlearn addresses from an entity that relies on MVRP or RSTP/MSTP and S-VIDs.

In one embodiment, MVRP can be modified to convey 24-bit I-SID values instead of 12-bit VLAN IDs. After the alteration, an I-component can signal a topology change to anther I-component. In one embodiment, where only a single service is involved, the I-component may use the same outer MAC address used for multicast data for that service. In another example, where two or more services are involved, an "All I-components" destination MAC address may be used.

Figure 2:
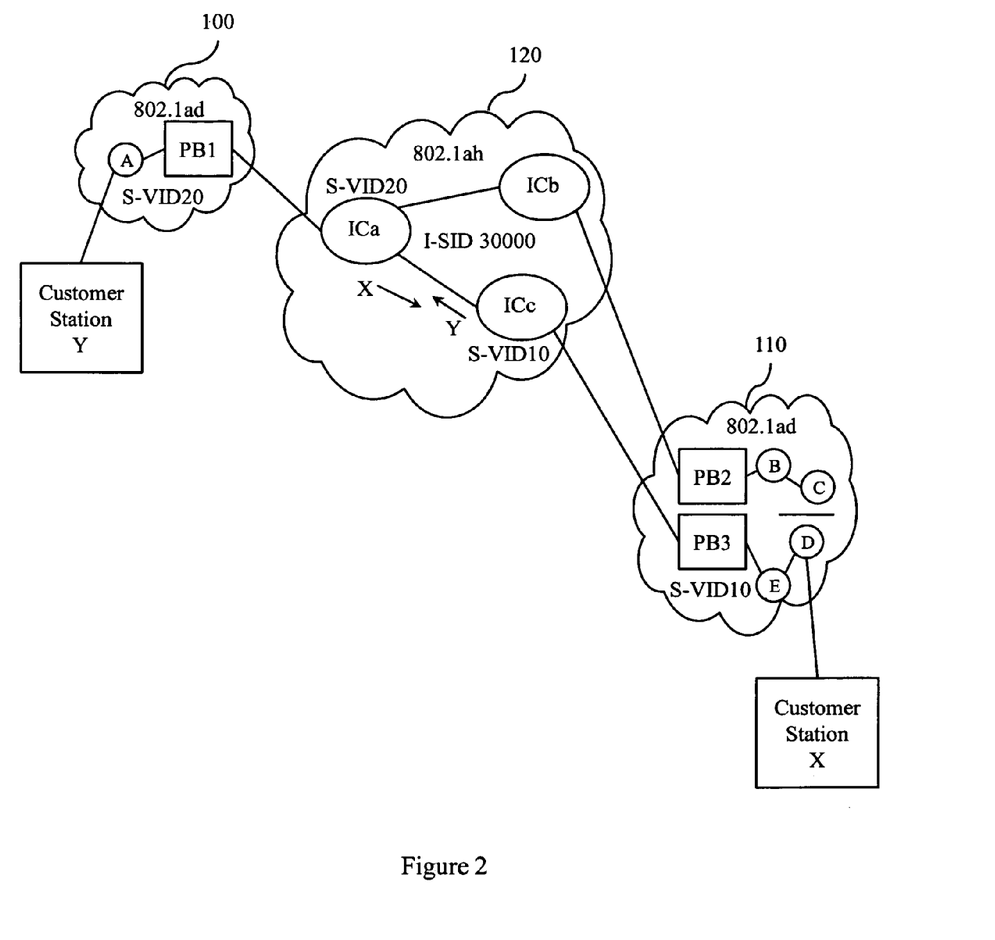
FIG. 2 illustrates a second state of a VLAN implemented across an S-cloud/PBB/S-cloud topology.

Turning now to FIG. 2, recall that 802.1ad and 802.1ah have different protocols and formats. For example, S-clouds may process S-tags associated with services while PBB-clouds may not carry S-tags across their backbone. Instead, a PBB-cloud may use I-tags. To understand one situation where MVRP may not perform as desired, consider the situation where the two S-clouds 100 and 110 may have independent S-VIDs associated with independent S-VID spaces and where the PBB-cloud 120 does not carry S-tags across the backbone. Insert into this scenario a service known by different S-VIDs in the two S-clouds. For example, a service associated with cloud 100 may be known by S-VID 20 while that service when associated with cloud 110 may be known by S-VID 10. To communicate between customer stations X and Y, the S-tag (e.g., S-VID 20) associated with the left S-cloud 100 would have to be translated/mapped to an I-SID (e.g., I-SID 30000) processed by the PBB-cloud 120, and then translated/mapped again to an S-tag (e.g., S-VID 10) associated with the right most S-cloud 110.

S-VID 10 is associated with a service in the right S-cloud 110. S-VID 20 is associated with the same service in the left S-cloud 100. S-VID 10 and S-VID 20 may be carried in S-Tags in the S-clouds. Recall that the PBB-cloud 120 does not carry S-tags. Instead, in this example, the PBB-cloud 120 has an I-SID with a value 30,000 that refers to the service associated with both S-VID 10 and S-VID 20. Therefore, I-components ICa, ICb, and ICc would have S-VID to I-SID mapping and/or translation logic. In this example, information may flow from customer station Y into cloud 100, through node A to PB1, out of cloud 100 and into cloud 120 though ICa, through cloud 120 to ICc, out of cloud 120 and into cloud 110 through PB3, then through nodes E and D to customer station X. Note that in cloud 100 the service is identified using S-VID 20 while in cloud 110 the service is identified using S-VID 10. Since cloud 120 does not carry S-VIDs, S-VID to I-SID mapping occurs at ICa and then I-SID to S-VID mapping occurs at ICc.

Figure 3:
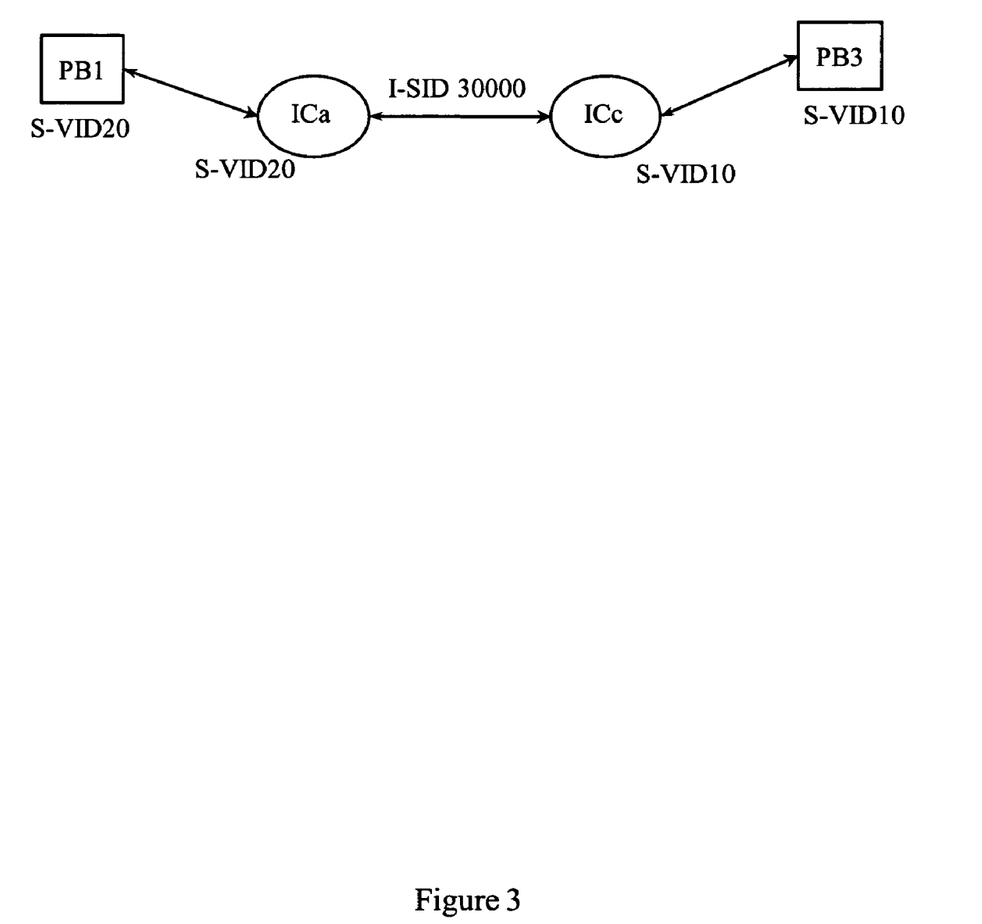
FIG. 3 illustrates a set of S-VIDs and I-SIDs associated with end-to-end communication between elements of a VLAN implemented across an S-cloud/PBB/S-cloud topology.

Over time, as information flows back and forth between user station X and user station Y, the I-components may learn routing information. For example, I-component ICa may learn that user station X is behind ICc. Similarly, I-component ICc may learn that user station Y is behind ICa. In FIGS. 1 and 2, user station X cannot be reached through ICb, because the active topology selection in S-cloud 110 has determined that the link between nodes C and D is reserved as a spare, and not used. Therefore, the I-components may have learned and settled on the ICc path to user station X. Thus, ICc may maintain a mapping/translation process for converting S-VID 10 to/from I-SID 30,000 and may maintain routing information for reaching user station Y through ICa. Similarly, ICa may maintain a mapping/translation process for converting S-VID 20 to/from I-SID 30,000 and may maintain routing information for reaching user station X through ICc. An example of this mapping is illustrated in FIG. 3.

Figure 4:
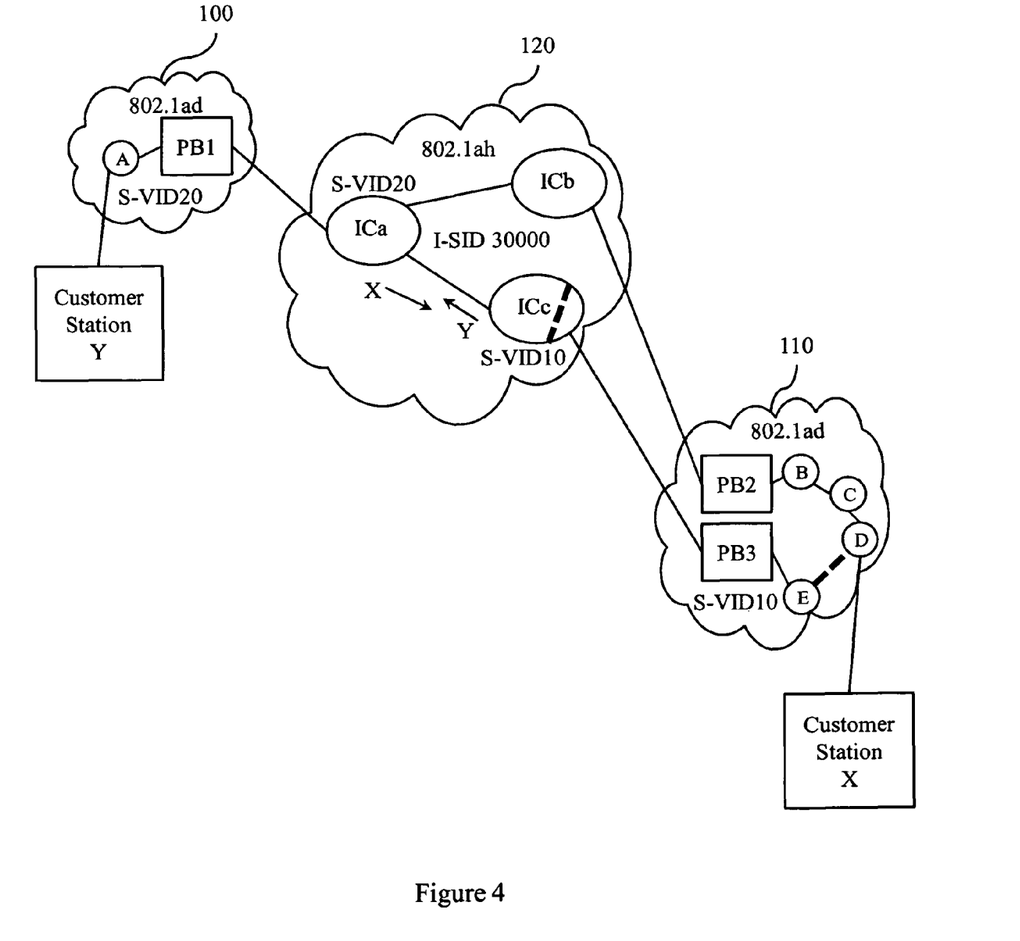
FIG. 4 illustrates a third state of a VLAN implemented across an S-cloud/PBB/S-cloud topology.

Turning now to FIG. 4, a different state for the S-cloud/PBB/S-cloud topology is shown. In this state, the information maintained in ICa and/or ICc will become out-of-date because a topology change has occurred in the right most S-cloud 110. For example, a cable may break somewhere between PB3 and user station X. The cable break is illustrated as a dotted line between nodes E and D between PB3 and user station X. After the cable break, information intended for user station X that is routed to ICc from ICa may not reach user station X. This blockage is illustrated as a thick dotted line in ICc. If user station X sends a frame that reaches Y by an alternative path (e.g., through PB2 and ICb), then information from user station Y may once again be correctly routed to user station X. However, until and/or if this X originating frame reaches Y, information may be incorrectly routed and subsequently lost.

Thus, an I-component like ICb may include means (e.g., hardware, software in execution, firmware, combinations thereof) for receiving a TCN associated with a component operating according to the 802.1ad protocol. ICb may also include hardware, software in execution, firmware, and/or combinations thereof for determining an I-SID related to an S-VID in the TCN. ICb may also include hardware, software in execution, firmware, and/or combinations thereof for signaling a second I-component operating according to the 802.1ah protocol and in data communication with the first 802.1ah I-component to selectively manipulate a routing data associated with a service associated with the TCN. While the hardware, software in execution, and firmware are described being located in ICb, it is to be appreciated that hardware, software in execution, and/or firmware employed in providing a MIRP PDU may reside in other locations associated with PBB-cloud 120.

It may be desired to more rapidly and pro-actively heal the damage done by the cable break. The damage may need to be healed in both the right most S-cloud 110 and in the PBB-cloud 120. The right most S-cloud 110 may employ the MVRP protocol to respond to the cable break. The MVRP protocol includes a TCN message. The MVRP protocol may be used to inform members of the right most S-cloud 110 that they should forget what they know about routing frames to user station X and/or to forget what they know about routing frames associated with S-VID 10. In addition, MVRP may be used to inform members of the right most S-cloud 110 that broadcast frames for S-VID 10 are required to be sent towards node D, and thus towards station X. Recall that MVRP relies on the local VID to convey this information in the right most S-cloud 110. Thus, MVRP relies on S-VID 10 when informing elements to forget routing information.

The MVRP action (e.g., TCN) may propagate from PB2 to ICb. However, ICb does not propagate S-Tags into the 802.1ah cloud 120 and does not rely on the local VID (e.g., S-VID 10). The service identifier carried among the three PB bridges ICa, ICb, and ICc is an I-SID. Therefore I-component ICb will be controlled to not propagate the MVRP action (e.g., TCN) as-is. Instead, example apparatus and methods described herein will control ICb to produce a different message that is useful to having the PBB-cloud 120 respond to the topology change in the right most S-cloud 110.

I-component ICb may want to tell ICa to "forget all the MAC addresses belonging to S-VID 10 that you did not learn from me." But ICb will be prevented from issuing this potentially confusing statement. The statement would be confusing because S-VID 10 is unknown, or known in a different mapping, by ICa. ICa interacts with the left most S-cloud 100 where the service is known by S-VID 20. ICa also interacts with the PBB-cloud 120 where the service is known by I-SID 30,000. Therefore example apparatus and methods described herein prevent ICb from sending an MVRP TCN message for S-VID 10 because it would be misinterpreted at ICa and elsewhere. Instead, a MIRP PDU may be provided to selected I-components.

In one embodiment, in addition to being controlled to produce the new message (e.g., MIRP PDU), ICb will be controlled to determine to where the new message is to be sent so that only appropriate I-components receive the MIRP PDU related to the TCN and perform the subsequent repair. For example, ICb may be controlled to send the new message to appropriate I-components that need to forget appropriate routing information and learn new routing information.

In one embodiment, ICb may be controlled to produce a PDU that resembles an MVRP TCN for I-SID 30,000 to ICa and ICb. This may be referred to as a MIRP PDU. ICb can be controlled to produce the MIRP PDU for I-SID 30,000 because it knows the translation from S-VID 10 to/from I-SID 30,000. ICb knows this translation because it performs that translation on data frames passing between ICb and PB2.

A MIRP PDU may not have double addresses and may not have an I-tag because a MIRP PDU may contain information about more than one I-SID. This MIRP PDU will be of no interest to backbone bridges that do not learn customer MAC addresses (e.g., bridges not at an edge of PBB cloud 120). Therefore, when sending a MIRP PDU, a determination may be made as to which I-components would be interested in the MIRP PDU. I-components at the edge of the PBB-cloud 120 would be interested in the MIRP PDU. B-components somewhere in the middle of the PBB-cloud 120 would likely not be interested in the MIRP PDU. Additionally, PBs outside the PBB-cloud 120 would likely not be interested in the MIRP PDU. Therefore, ICb may be controlled to determine I-components that are interested in the MIRP PDU and then to target the MIRP PDU at those I-components.

While MIRP shares some attributes of MVRP, it also has some differences. For example, a MIRP PDU carries 24 bit I-SIDs as its attributes instead of the MVRP 12 bit VIDs. Additionally, a MIRP PDU is only of interest to I-components that decode I-tags. Thus, a MIRP PDU may only be of interest at the edge of a PBB-cloud, and not in its interior. Therefore, a MIRP PDU may not propagate like an MVRP TCN. Instead of using the MVRP hop-to-hop approach, a one-hop approach may be employed. In the one-hop approach, a MIRP PDU may be provided from one I-component to another I-component.

I-component ICb may encounter three different scenarios. In a first scenario, information about only one I-SID may be contained in the MIRP PDU. In this first scenario, the MIRP PDU may be sent to a destination MAC address used for multicast data frames for that I-SID. In a second scenario, information about more than one I-SID may be contained in the MIRP PDU. In this second scenario, the MIRP PDU may be sent to a special case "All I-components" group MAC address. Thus, example apparatus and methods include defining an "All I-components" group MAC address, that allow a MIRP PDU to reach all of the I-components within a single B-VLAN used to carry some number of services, each with its own I-SID. In a third scenario, the MIRP PDU may be sent to all other I-components, by using a B-VLAN reserved for the purpose, to which all I-components are connected for sending and receiving MIRP PDUs.

Various decisions may be reached concerning where an MIRP logic is to be placed in an 802.1ah architecture. In one embodiment, an SAP may be added. The SAP may connect an I-component to a PIP over which non I-tagged traffic may pass. In this example, the I-component be configured to use PIP SAPs to transmit and receive MIRP PDUs.

While example systems and methods concern TCN handling between 802.1ad and 802.1ah networks, it is to be appreciated that MIRP may be employed in other contexts. Consider FIG. 5, where MIRP may be used when two backbone clouds are connected by a pair of NNIs that are I-tagged only (i.e., the frames between them carry no B-tag). Consider the two backbone clouds illustrated in FIG. 5.

Figure 5:
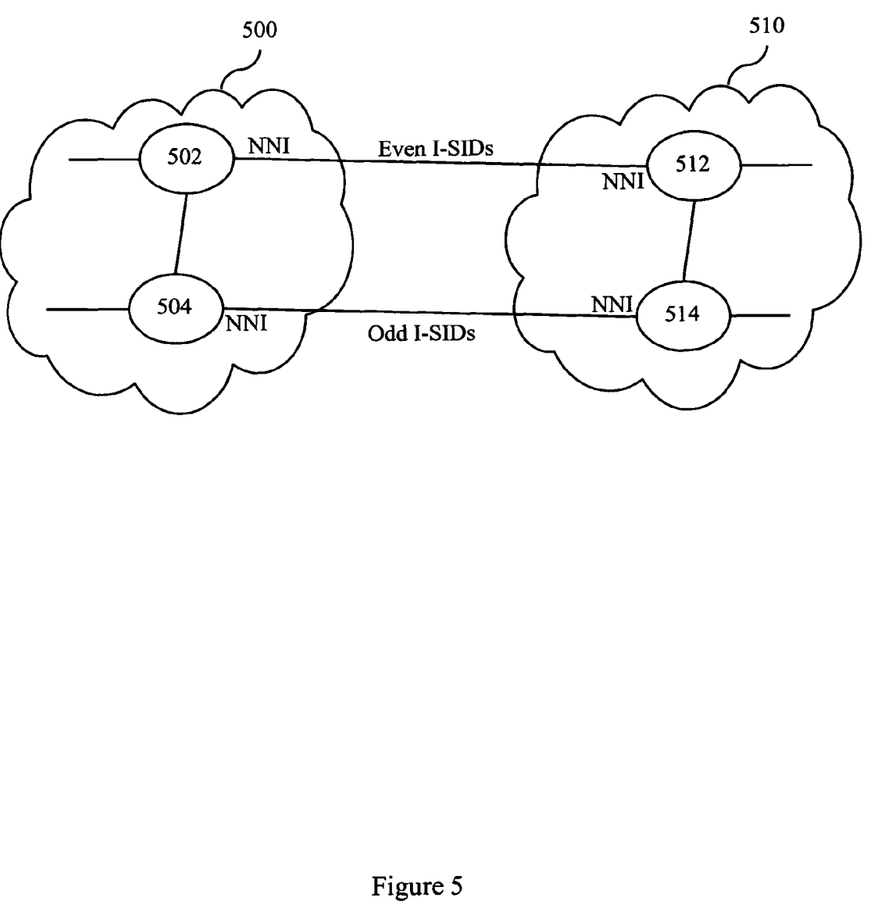
FIG. 5 illustrates two backbone clouds connected by a pair of network node interfaces that are I-tagged only.

Each of bridges 502, 504, 512, and 514 may supply a B-VLAN for a received frame based on looking up the I-SID in a table. Consider the case where bridges 512 and 514 are running L2GP to decide which services, and thus which I-SID values, use the 502-512 link and which use the 504-514 link. In this case, bridges 502 and 504 may follow the lead of bridges 512 and 514.

Bridges 512 and 514 may communicate their preferences to bridges 502 and 504 using MIRP. More generally, bridges in a first backbone cloud may communicate their preferences to bridges in a second backbone cloud using MIRP. This approach shares some similarities with how MVRP is used with L2GP to connect an S-cloud to a backbone cloud or to connect a customer cloud to an S-cloud or a backbone cloud. Recall that even after a TCN has been generated, a bridge may advertise needs. It is these advertisements that motivate the embodiment associated with FIG. 5, not the TCN portion of MVRP/MIRP.

Figure 6:
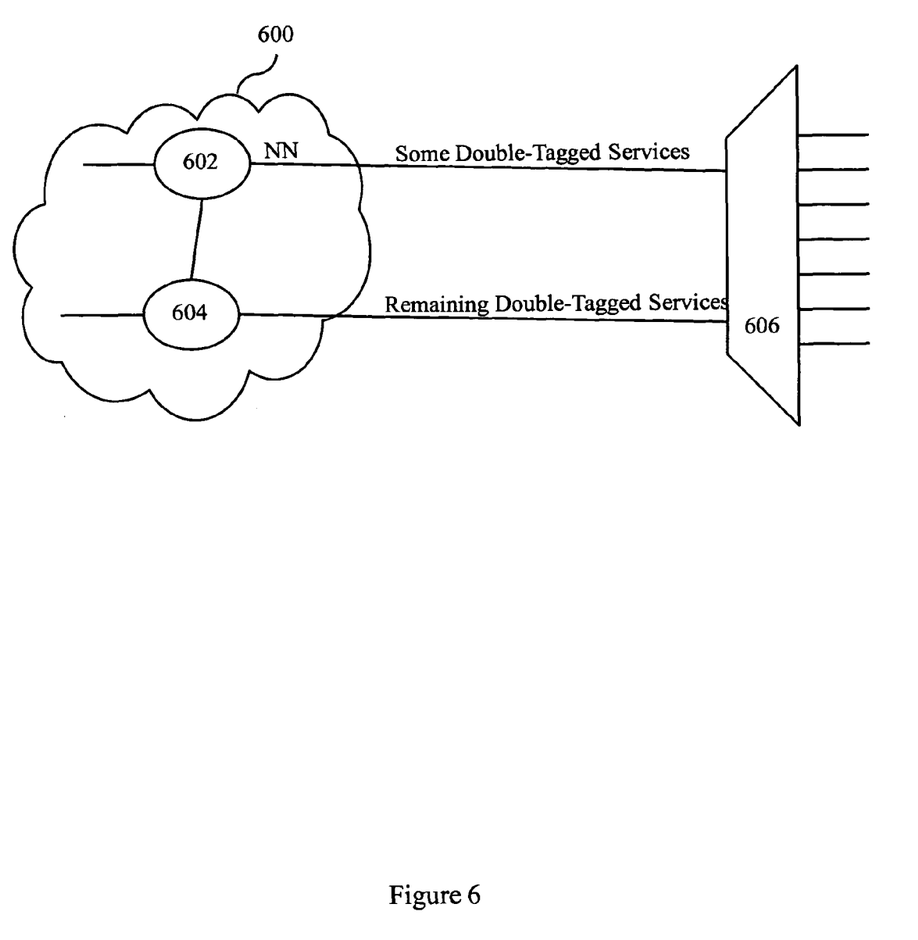
FIG. 6 illustrates a double-tagged DSLAM that is running an L2GP equivalent.

FIG. 6 illustrates yet another way in which MIRP may be employed. Consider a double-tagged DSLAM 606 that is running the equivalent of L2GP. Recall that a DSLAM is a network device that allows telephone lines to connect to the Internet. A DSLAM may connect multiple customer DSLs to a high-speed Internet backbone line using multiplexing techniques. A double-tagged frame will have two tags, (e.g., 2 12-bit VLAN tags). A double-tagged DSLAM may be tasked with making the decision as to which services use which uplink. In the example illustrated in FIG. 6, the double-tagged DSLAM 606 may tell core network devices (e.g., 602, 604) what decision has been made using MIRP. Since an L-SID has 24 bits available, the two 12-bit VLAN tags may be manipulated and transported in the 24-bit I-SID.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
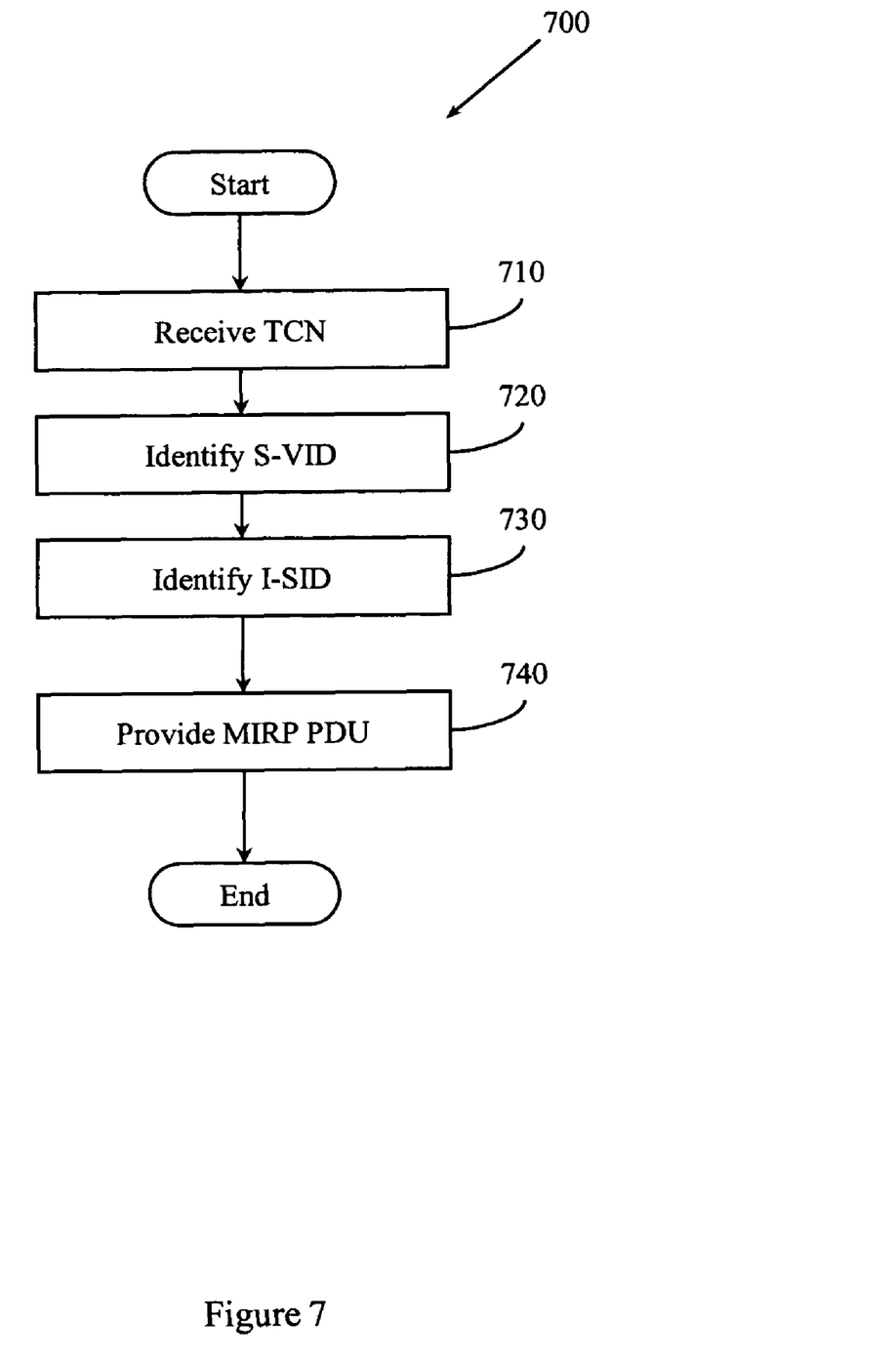
FIG. 7 illustrates an example method associated with MIRP.

FIG. 7 illustrates a method 700 associated with MIRP. Method 700 includes, at 710, receiving a TCN in an 802.1ah I-component. The TCN may be associated with, for example, an MVRP, an RSTP, and/or an MSTP. The TCN may be received from an 802.1ad bridge associated with a LAN in which a topology change occurred. The topology change may affect a service. An affected service may be identified in the TCN by an S-VID.

Method 700 includes, at 720, identifying an S-VID associated with a TCN. In one embodiment, an S-VID may be a 12-bit value known to the providing 802.1ad element(s) (e.g., PB). The S-VID may be related to and in a first S-VID space that is independent of yet related to another S-VID space in another 802.1ad LAN.

Method 700 may include, at 730, identifying the I-SID related to an affected S-VID. The 802.1ah I-component may maintain an S-VID to I-SID mapping to facilitate transporting service information across a PBB that does not transport S-Tags. The 802.1ad component may also maintain a set of routing data to control how information is processed in the PBB. Therefore, identifying the I-SID related to an affected S-VID identified in the TCN may include examining data stored by an 802.1ah I-component.

With the I-SID determined, method 700 may conclude, at 740, by providing an 802.1ah MIRP PDU to an 802.1ah component. The MIRP PDU is based, at least in part, on the identified I-SID and the TCN. The MIRP PDU may instruct an 802.1ah I-component to forget routing information associated with a service identified by the I-SID. For example, the MIRP PDU may signal a remote I-component to forget an association between a customer-space MAC address and a b-space I-component MAC address, where the association is related to the service associated with the S-VID.

Figure 8:
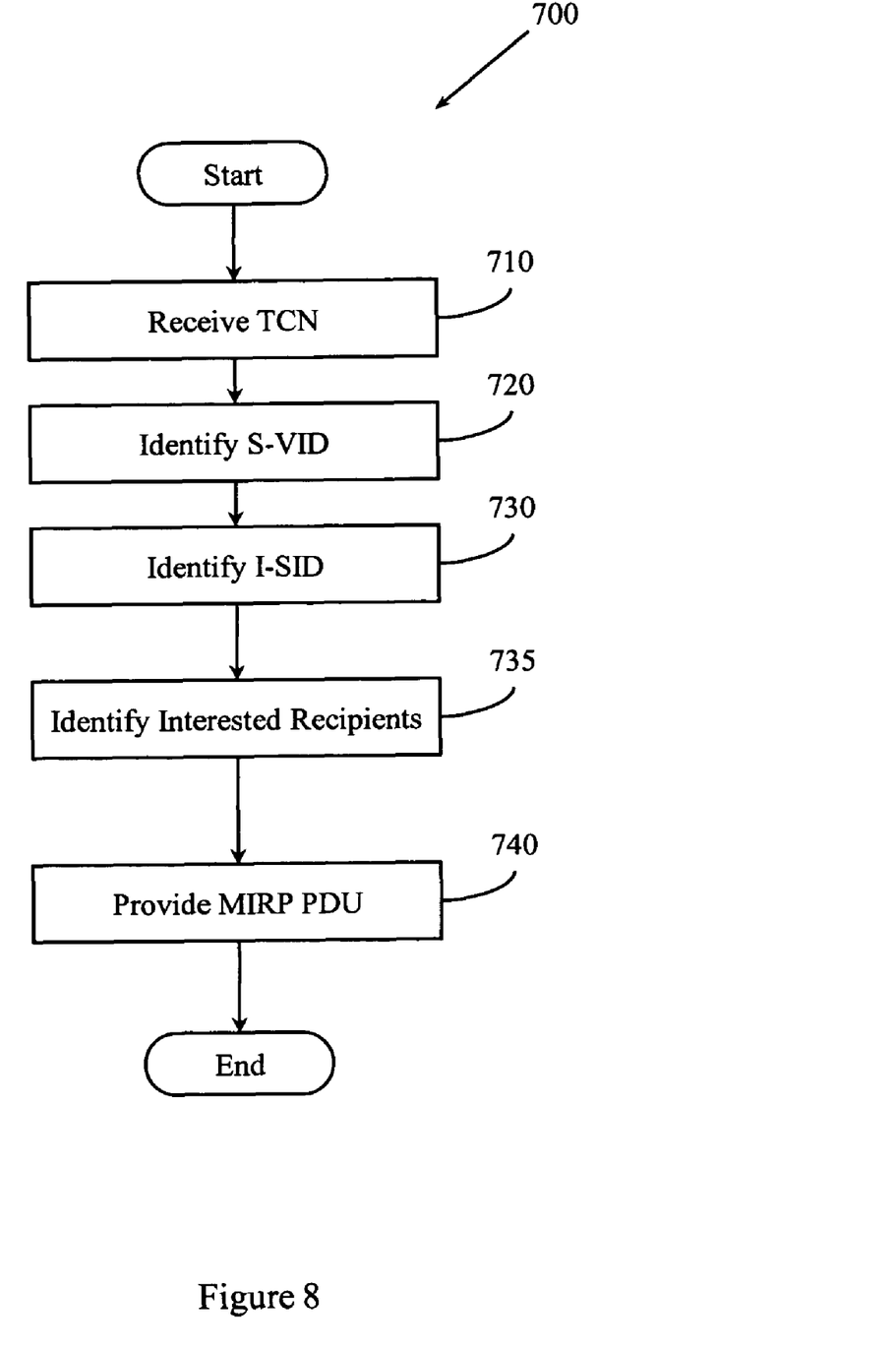
FIG. 8 illustrates an example method associated with MIRP.

FIG. 8 illustrates another example of method 700. This example includes several actions illustrated in FIG. 7. For example, method 700 includes receiving a TCN at 710, identifying an S-VID at 720, and identifying an I-SID related to the S-VID at 730. However, this embodiment of method 700 also includes, at 735, identifying 802.1ah I-components to receive the MIRP PDU. In one embodiment, a map of edge I-components in a PBB that interact with an 802.1ad component may be maintained. In this example, the 802.1ah I-components may be identified from the map. In another embodiment, 802.1ah components may be discovered on-the-fly on an as-needed basis.

Determining which 802.1ah I-components are to receive the MIRP PDU may include determining how many services are associated with the TCN. In one example, the TCN may be associated with a single service. Therefore the MIRP PDU may be provided to a destination MAC address associated with providing multicast data frames associated with the I-SID. In another example, the TCN may be associated with two or more services. In this example, the MIRP PDU may be provided to a destination MAC address associated with a group of I-components.

Having determined which 802.1ah I-components are to receive the 802.1ah MIRP PDU, method 700 may then provide the MIRP PDU using different approaches. In one embodiment, the 802.1ah MIRP PDU is to be provided to 802.1ah I-components using a single hop technique. Thus, non-edge I-components may not incur the overhead of processing a PDU that is of no interest to them. In another embodiment, the 802.1ah MIRP PDU may be provided to 802.1ah I-components using an MVRP hop-to-hop technique.

Figure 9:
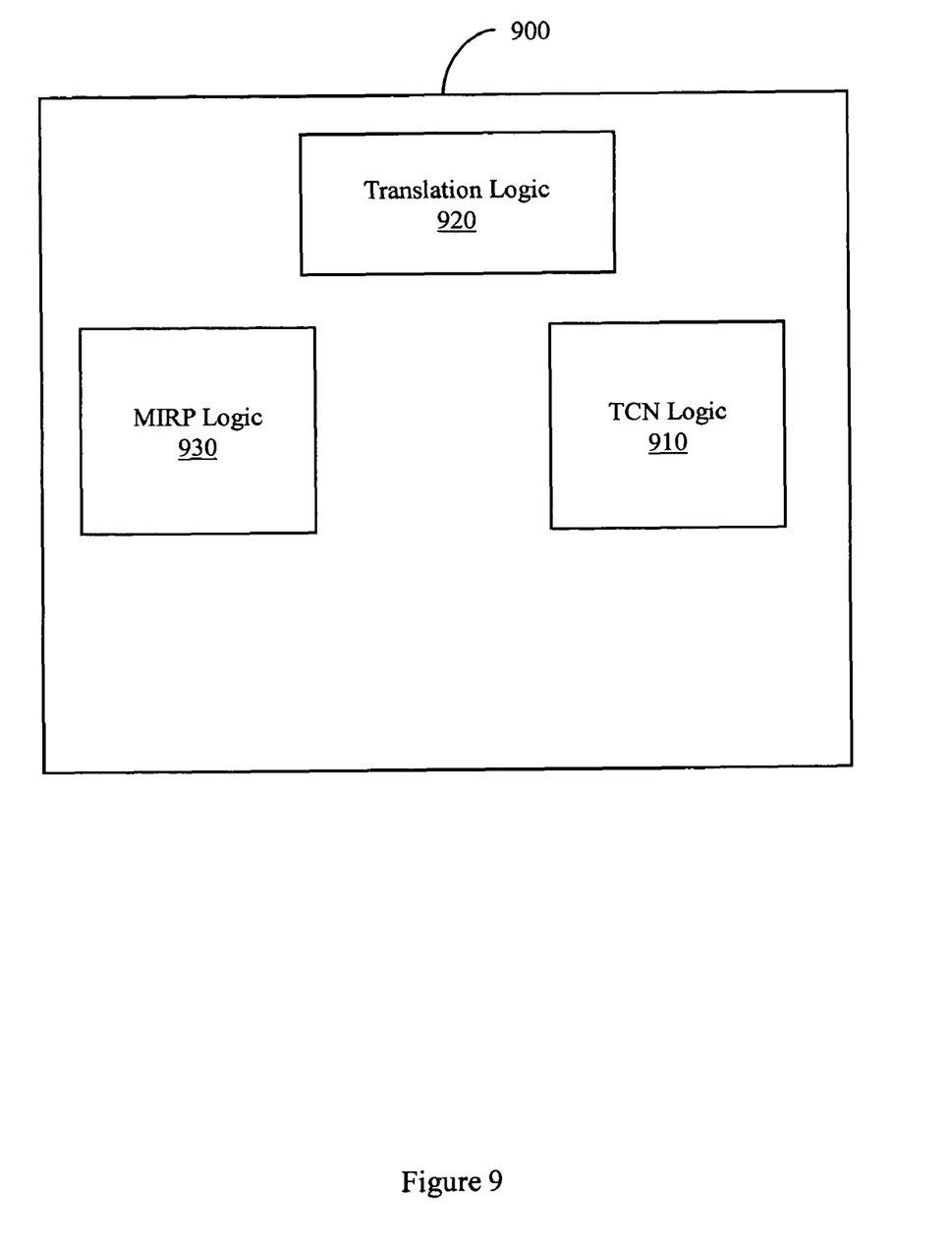
FIG. 9 illustrates an example apparatus associated with MIRP.

FIG. 9 illustrates an apparatus 900 associated with MIRP. Apparatus 900 includes a TCN logic 910 to receive a TCN into an 802.1ah I-component. A logic may include hardware, firmware, software in execution on a machine, and/or combinations of each to perform a function(s) or an action(s), and/or to cause a function or action from another logic, method, and/or system. Where multiple logical logics are described, it may be possible to incorporate the multiple logical logics into one physical logic. Similarly, where a single logical logic is described, it may be possible to distribute that single logical logic between multiple physical logics. The 802.1ah I-component may be associated with a set of 802.1ah I-components organized in a PBB-cloud. The TCN may be received, for example, from an MVRP, RSTP, and/or MSTP. The TCN may be received from an 802.1ad bridge associated with a LAN in which a topology change occurred. The topology change may be associated with a service. The service may be identified in the TCN by an S-VID. The apparatus 900 may be associated with a PBB. In one embodiment, apparatus 900 may reside in an SAP connected to a PIP over which non I-tagged traffic may pass.

Apparatus 900 includes a translation logic 920. The translation logic 920 translates an S-VID associated with the MVRP TCN to an I-SID. The S-VID may identify a service known to the sending 802.1ad device. The S-VID may be, for example, a 12 bit S-VID. The I-SID may be, for example, a 24 bit I-SID. The 24-bit I-SID may be transportable across the 802.1ah PBB. In one embodiment, the translation logic is to process a set of S-VID to I-SID mapping data associated with the first 802.1ah I-component. This set of mapping data may be stored in the 802.1ah I-component and/or may be acquired on-the-fly.

Apparatus 900 includes an MIRP logic 930 to produce a MIRP PDU. The PDU is related to the TCN and carries a list of affected 24-bit I-SIDs. The MIRP PDU may be used to signal the need for a remote I-component to forget associations between customer-space MAC addresses and b-space I-component MAC addresses. The association may be related to the service associated with the S-VID. Thus, the MIRP logic 930 may control a second 802.1ah I-component associated with the PBB-cloud to relearn an association between a customer-space MAC address and a B-space I-component MAC address.

Figure 10:
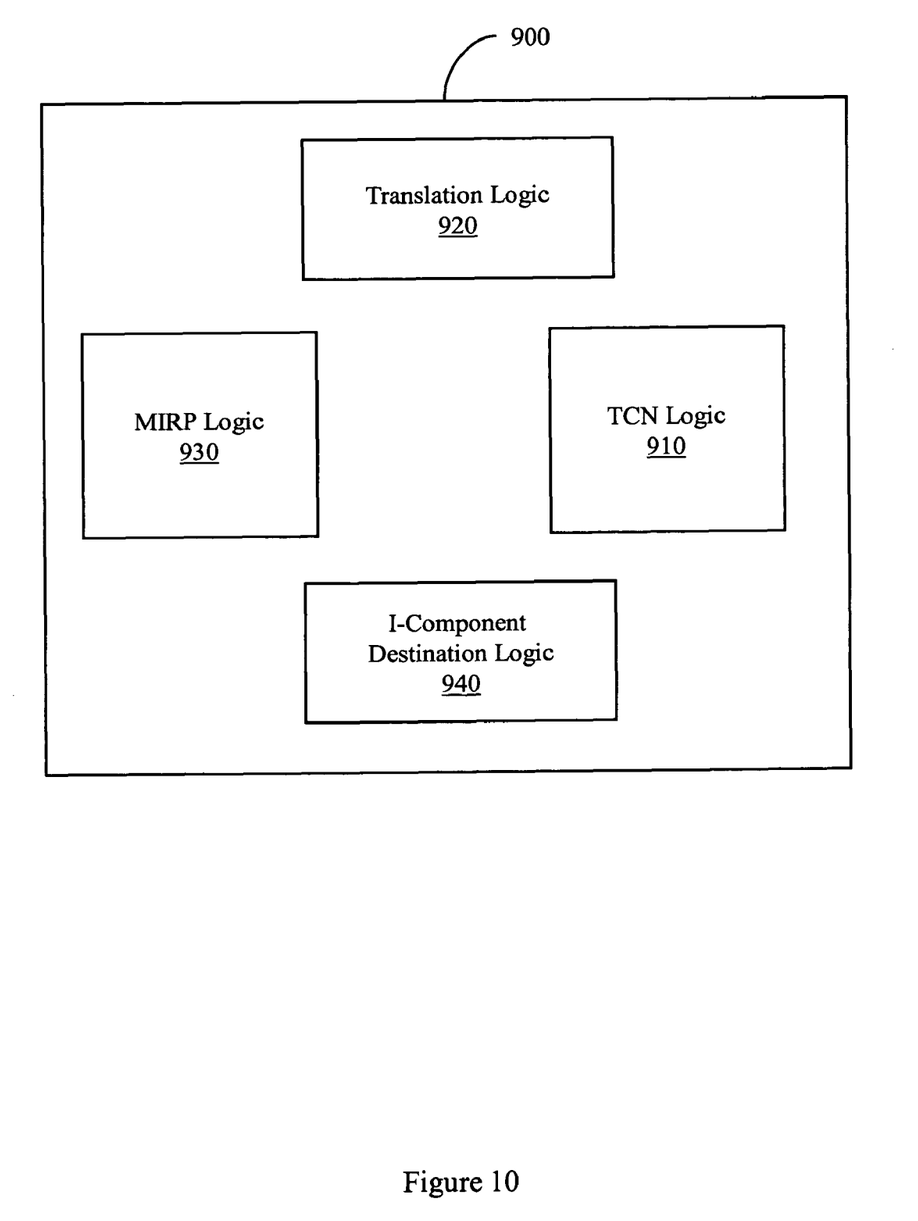
FIG. 10 illustrates an example apparatus associated with MIRP.

FIG. 10 illustrates another example of apparatus 900. In this example, apparatus 900 may not wish to transmit the MIRP PDU to every I-component reachable from a receiving I-component with which apparatus 900 is associated. Therefore, apparatus 900 may include an I-component destination logic 940 to identify a set of I-components to receive the MIRP PDU. The set of I-components may be, for example, I-components at the edge of the 802.1ah PBB that maintain an I-SID to S-VID translation table and/or logic. In one embodiment the I-component destination logic 940 is to provide the MIRP PDU to a destination MAC address associated with providing multicast data frames associated with the I-SID upon determining that the MVRP logic has determined that the TCN is associated with a single service. In another embodiment, the I-component destination logic 940 is to provide the MIRP PDU to a destination MAC address associated with a group of I-components upon determining that the MVRP logic has determined that the TCN is associated with two or more services.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer readable medium containing a program which, when executed, performs an operation comprising:
   receiving one of, a VLAN registration, and a topology change notification (TCN) in a first 802.1ah I-component;
   identifying a service VLAN identifier (S-VID) associated with the TCN, where the S-VID is associated with a service in a network from which the TCN was received;
   identifying an instance service identifier (I-SID) related to the S-VID; and
   selectively providing an 802.1ah multiple instance service registration protocol (MIRP) protocol data unit (PDU) to signal a second 802.1ah component to ignore an association between a customer-space media access control (MAC) address and a b-space I-component MAC address, where the association is related to the service.

2. The computer readable medium of claim 1, where the TCN is one of, a multiple VLAN registration protocol (MVRP) TCN, a rapid spanning tree protocol (RSTP) TCN, and a multisource transport platform (MSTP) TCN.

3. The computer readable medium of claim 1, where the TCN is received from an 802.1ad S-bridge.

4. The computer readable medium of claim 3, where the S-VID is a 12 bit service identifier and where the I-SID is a 24 bit identifier.

5. The computer readable medium of claim 1, where identifying the I-SID related to the S-VID includes processing a set of S-VID to I-SID mapping data associated with the 802.1ah I-component.

6. The computer readable medium of claim 1, where TCN notifications for multiple I-SIDs are signaled in a single MIRP PDU.

7. The computer readable medium of claim 6, where the 802.1ah MIRP PDU is to be provided to members of the set of I-components using a single hop technique.

8. The computer readable medium of claim 6, where the 802.1ah MIRP PDU is to be provided to members of the set of I-components using an MVRP hop-to-hop technique.

9. The computer readable medium of claim 1, where the operation includes identifying a set of 802.1ah I-components to receive the 802.1ah MIRP PDU.

10. The computer readable medium of claim 1, where the MIRP PDU can signal needs for at least four thousand VIDs/SIDs.

11. The computer readable medium of claim 1, where the TCN is associated with a single service and where the MIRP PDU is to be provided to a destination MAC address associated with providing multicast data frames associated with the I-SID.

12. The computer readable medium of claim 1, where the TCN is associated with two or more services and where the MIRP PDU is to be provided to a destination MAC address associated with a group of I-components.

13. The computer readable medium of claim 1,
where the TCN is an MVRP TCN received from an 802.1ad S-bridge;
where the S-VID is a 12 bit service identifier;
where the I-SID is a 24 bit identifier;
where identifying the I-SID related to the S-VID includes processing a set of S-VID to I-SID mapping data associated with the 802.1ah I-component that received the TCN; and
where the operation includes identifying a set of 802.1ah I-components to receive the 802.1ah MIRP PDU, where the set of 802.1ah I-components are to receive the MIRP PDU by one of, a single hop technique, and a hop-to-hop technique; and
when the TCN is associated with a single service, the MIRP PDU is to be provided to a destination MAC address associated with providing multicast data frames associated with the I-SID and when the TCN is associated with two or more services the MIRP PDU is to be provided to a destination MAC address associated with a group of I-components.

14. An apparatus, comprising:
a topology change notification (TCN) logic to receive a TCN from an 802.1ad device, where the TCN logic is associated with a first 802.1ah 1 component associated with a provider backbone bridge (PBB) cloud;
a translation logic to translate a service VLAN identifier (S-VID) to an instance service identifier (I-SID), where the S-VID is associated with the TCN and where the S-VID identifies a service known to the 802.1ad device; and
a multiple I-service registration protocol (MIRP) logic to produce a MIRP protocol data unit (PDU) that is based, at least in part, on the TCN, the S-VID and the I-SID, where the MIRP PDU is to control a second 802.1ah I-component associated with the PBB-cloud to relearn an association between a customer-space media access control (MAC) address and a B-space I-component MAC address, where the association is related to the service.

15. The apparatus of claim 14, where the TCN is one of, an MVRP TCN, an RSTP TCN, and an MSTP TCN.

16. The apparatus of claim 15, where the S-VID is a 12 bit identifier and where the I-SID is a 24 bit identifier.

17. The apparatus of claim 14, where the translation logic is to process a set of S-VID to I-SID mapping data associated with the first 802.1ah I-component.

18. The apparatus of claim 14, including an I-component destination logic to identify a set of 802.1ah I-components to receive the MIRP PDU.

19. The apparatus of claim 18, where the I-component destination logic is to provide the MIRP PDU to a destination MAC address associated with providing multicast data frames associated with the I-SID upon determining that the MVRP logic has determined that the TCN is associated with a single service.

20. The apparatus of claim 18, where the I-component destination logic is to provide the MIRP PDU to a destination MAC address associated with a group of I-components upon determining that the MVRP logic has determined that the TCN is associated with two or more services.

21. A system, comprising:
means for receiving one of, a VLAN registration, and a topology change notification (TCN) in a first 802.1ah I-component;
means for identifying a service VLAN identifier (S-VID) associated with the TCN, where the S-VID is associated with a service in a network from which the TCN was received;
means for identifying an instance service identifier (I-SID) related to the S-VID; and
means for selectively providing an 802.1 ah multiple instance service registration protocol (MIRP) protocol data unit (PDU) to signal a second 802.1ah component to ignore an association between a customer-space media access control (MAC) address and a b-space I-component MAC address, where the association is related to the service.

* * * * *

UNITED STATES PATENT AND TRADEMARK OFFICE
CERTIFICATE OF CORRECTION

PATENT NO. : 7,839,800 B2
APPLICATION NO. : 12/218169
DATED : November 23, 2010
INVENTOR(S) : Finn et al.

Page 1 of 1

It is certified that error appears in the above-identified patent and that said Letters Patent is hereby corrected as shown below:

Column 14, Claim 14, Line 1, please delete "1 component" and insert --I-component-- therefor;

Column 14, Claim 14, Line 2, please insert --and where the TCN logic includes hardware-- after cloud;

Column 14, Claim 21, Line 49, please delete "802.1 ah" and insert --802.1ah-- therefor.

Signed and Sealed this
Seventeenth Day of July, 2012

David J. Kappos
*Director of the United States Patent and Trademark Office*